March 1, 1960     I. D. WALLACH     2,926,552
TRANSMISSION

Filed Jan. 22, 1958     3 Sheets-Sheet 1

*INVENTOR.*
Irving D. Wallach by
Kane, Dalsimer and Kane
ATTORNEYS

March 1, 1960

I. D. WALLACH 2,926,552

TRANSMISSION

Filed Jan. 22, 1958

INVENTOR.
Irving D. Wallach by
Kane, Dalsimer and Kane

ATTORNEYS

March 1, 1960     I. D. WALLACH     2,926,552
TRANSMISSION
Filed Jan. 22, 1958     3 Sheets-Sheet 3
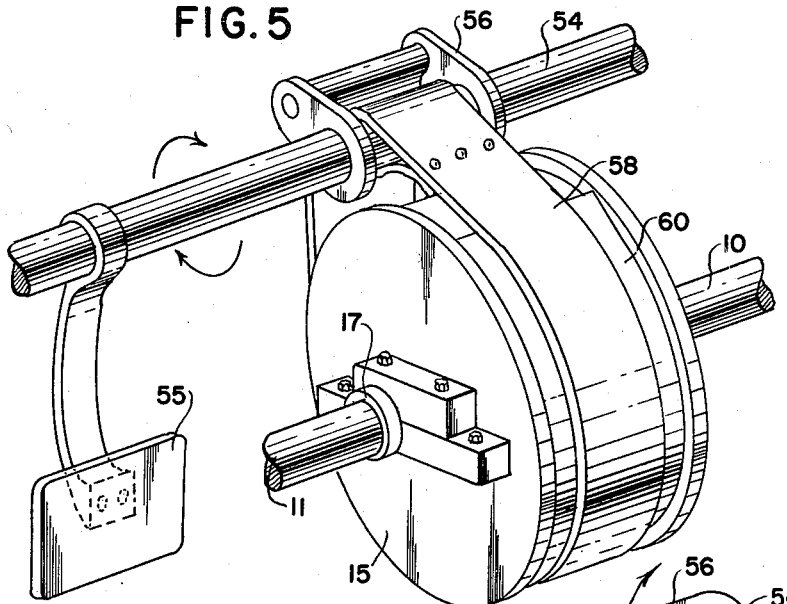
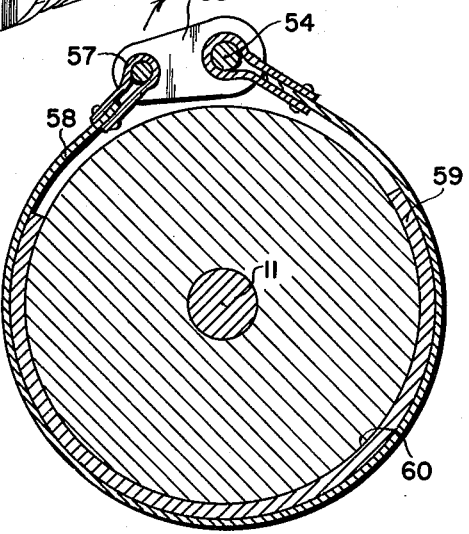
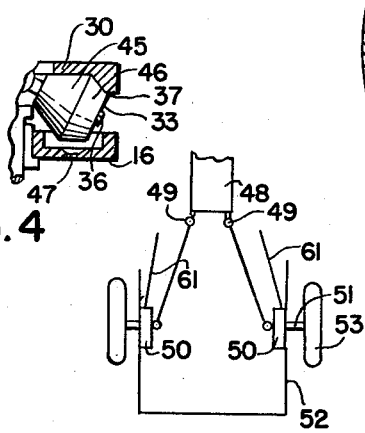
INVENTOR.
Irving D. Wallach
by
Kane, Dalsimer and Kane
ATTORNEYS

United States Patent Office 2,926,552
Patented Mar. 1, 1960

2,926,552

TRANSMISSION

Irving D. Wallach, Huntington, N.Y., assignor to Conotorc, Inc., Port Washington, N.Y.

Application January 22, 1958, Serial No. 710,562

15 Claims. (Cl. 74—757)

This invention relates to a structurally and functionally improved transmission capable of use in numerous different associations and of primary value when applied to an automotive vehicle to control the movements of the latter.

This application is a continuation-in-part of my earlier application for patent on "Transmission," filed on January 25, 1957, and identified under Serial No. 636,386, now abandoned.

It is a primary object to provide a mechanism of this character in which a completely balanced arrangement of all moving parts will be present, such that the flow of power through the assembly will be smooth, continuous, free of vibratory impulses and shocks and of infinite input-to-output speed ratio.

An additional object is that of designing an improved transmission in which the parts may be controlled in a manner such that under certain conditions of installation the mechanism will function as a clutch, brake, differential, torsional vibration eliminator, reduction gear (in both forward and reverse driving) and torque or speed equalizer.

Among other objects of the invention are those of furnishing an apparatus of this type which will include relatively few parts, each individually simple and rugged in construction, and such parts being capable of ready manufacture and assembly to furnish a unitary transmission operation over long periods of time with freedom from all difficulties.

With these and other objects in mind, reference is had to the attached sheets of drawings illustrating practical embodiments of the invention and in which:

Fig. 4 illustrates a connecting element of a form slightly different from that shown in the preceding views;

Fig. 5 is a perspective view illustrating one application of the transmission;

Fig. 6 is a partly sectional side view of the parts as illustrated in Fig. 5; and Fig. 7 is a diagrammatic view illustrative of one manner of associating the transmission with a power-driven vehicle.

Figure 1:
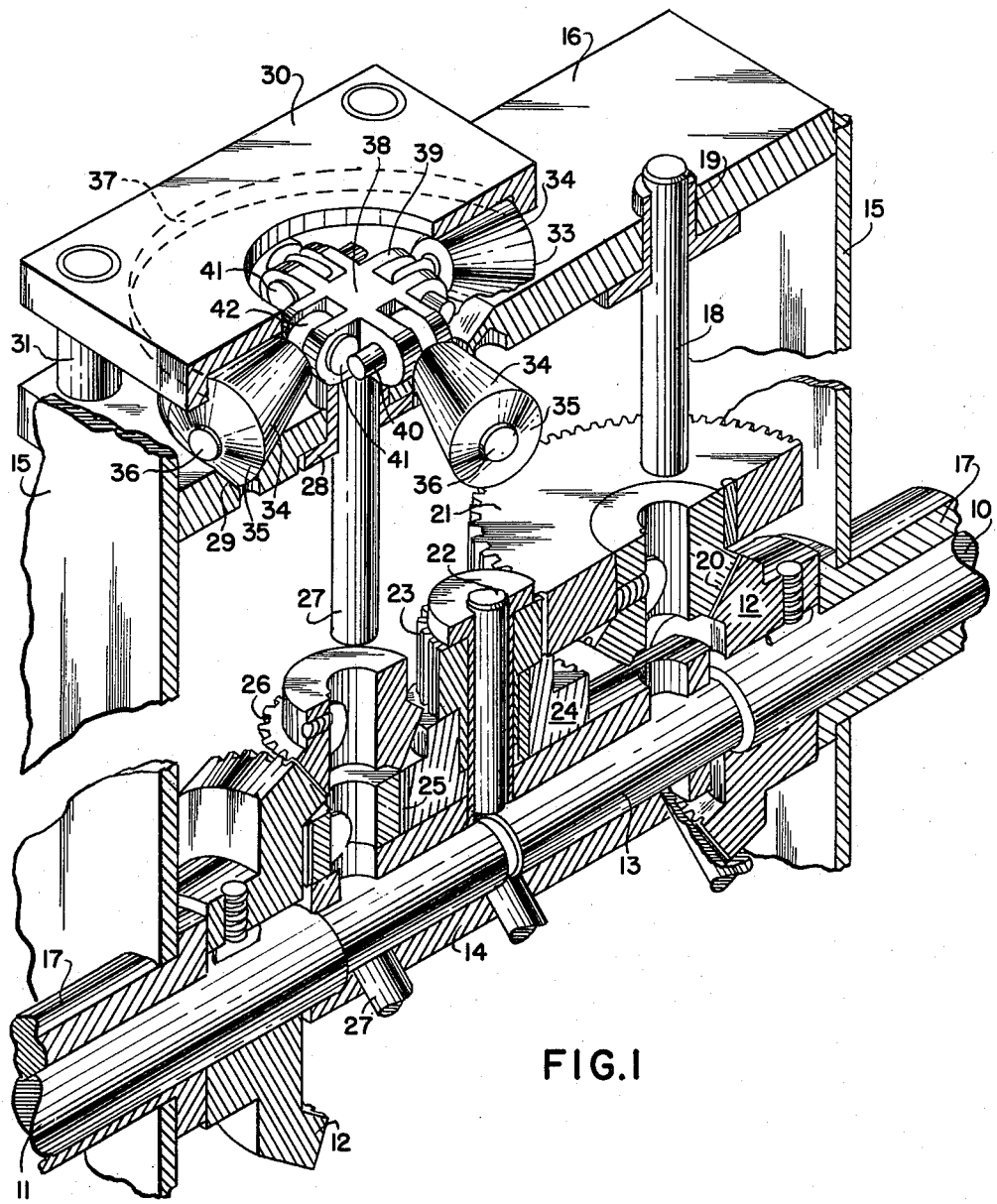
Fig. 1 is a partly sectional perspective view with the components of the assembly separated to some extent in order that their cooperation may be visualized.

Referring to Fig. 1, the numeral 10 indicates a driven shaft, and 11 a driving shaft. Secured against rotation with respect to these shafts are bevel gears 12. Between those gears, shafts 10 and 11 may be of reduced diameter, as indicated at 13. Within this zone a supporting sleeve 14 encircles shafts 10 and 11 and is rotatable with respect to the same.

Preferably disposed exteriorly of bevel gears 12 is a connecting frame or housing conveniently involving side panels 15 connected to a cross piece 16. The panels 15 are formed with openings through which shafts 10 and 11 extend. Interposed between the edges of these openings and the faces of the shafts are bearings 17. These are free to rotate with respect to shafts 10 and 11.

A number (preferably three) of identical connecting assemblies are included within the transmission and extend, under equal spacing, radially from its axis. In order to avoid confusing illustration, only one set of these has been shown in Fig. 1. Thus, having its inner end in rotatable bearing relationship with the sleeve 14 is a shaft 18. A bearing 19 for the outer end of this shaft is carried by the cross piece 16. A pinion 20 has its teeth in mesh with the teeth of bevel gear 12 and is secured against movement with respect to a gear 21. Shaft 18 turns with these gears. The inner end of a radially extending shaft 22 also has rotatable bearing with sleeve 14 and mounts a gear 23, the diameter of which is less than that of gear 21. Its teeth mesh with the teeth of the latter. Secured to move in unison with gear 23 is a gear 24 of larger diameter. The teeth of the latter mesh with the teeth of an adjacent gear 25 of relatively small diameter. That gear is fixed against movement with respect to a pinion gear 26, the teeth of which mesh with bevel gear 12 affixed to the driving shaft 11.

A shaft 27 mounts gears 25 and 26 and may serve as the coupling member therefor. The inner end of this shaft preferably has rotatable bearing within sleeve 14. Its outer end extends through a bearing 28 carried by the cross piece 16. The outer surface of the cross piece in a zone adjacent shaft 27 is surfaced as at 29 to furnish an annular groove. Obviously, instead of forming the latter in the surface of the cross piece, a separate sheet or body of material might be utilized. In any event, spaced radially from the surface providing this groove is a raceway member 30 which may be in the form of a plate and which is a part of a connecting or coupling structure. The spacing of plate 30 from cross piece 16 may be effected conveniently by mounting posts 31 which maintain that plate as a fixed part of the assembly.

Also included in the connecting or coupling structure is a series of coupling elements. As afore brought out, it is preferred to employ three of these spaced 120° around the transmission axis. Each of these assemblies will be connected to the outer end of a shaft 27 driven by a pinion 26; three of the latter being spaced around sleeve 14 and the operating surface of bevel gear 12 affixed to driving shaft 11. Specifically, cone-shaped elements 33 should be present in each assembly and be at least four in number. These cone elements include side faces 34 and base faces 35. They are rotatably and slidably mounted upon wing shafts 36 connected to the outer end of each shaft 27. Their side faces 34 are of a length such that they may bear against the adjacent face of plate 30 in flat contact therewith. Their base surfaces 35 may bear against the inner face of the annular flange 37 carried by plate 30. The groove surfaces 29 of the cross piece 16 or its equivalent are, of course, contoured so that elements 34 may rest within the trackway furnished by those surfaces when the elements are not in engagement with the surfaces of plate 30 and flange 37.

Figure 3:
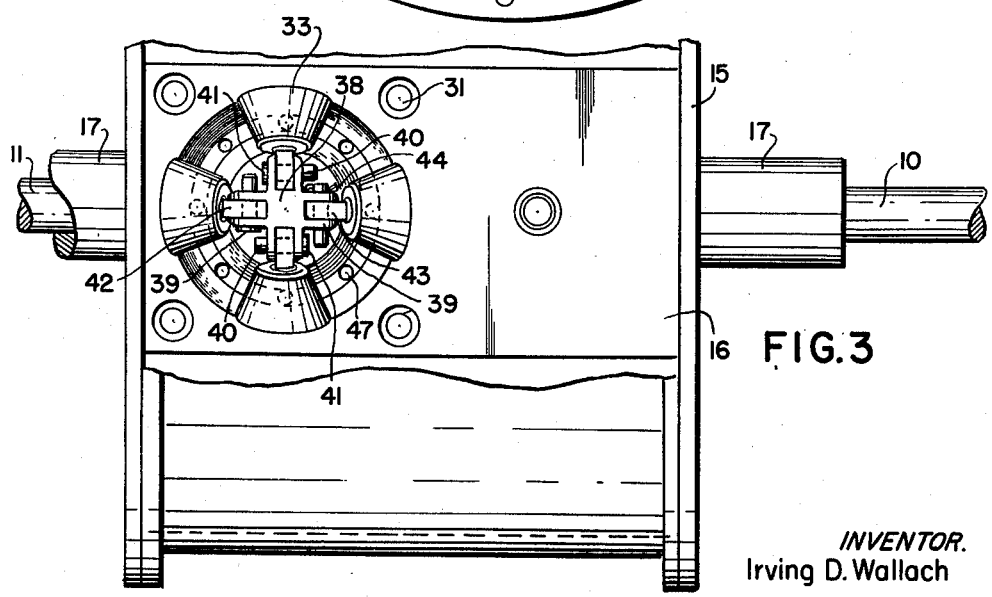
Fig. 3 is a fragmentary plan view thereof with certain elements removed to disclose underlying structures.

In order to secure the wing shaft 36 to shaft 27, a clevis and pin arrangement is preferably utilized. As shown in Fig. 3 and Fig. 1, the clevis head 38 is attached against rotation with respect to shaft 27 and in the illustrated embodiment presents pairs of supporting ears 39 spaced 90° from each other around the axis of a shaft 27. These ears are perforated to receive pins 40 having heads 41. The inner ends of wing shafts 36 are conveniently in the form of eyes 42 through which pins 40 pass. The length of those pins is such that the shank end of one overlies the headed end of another throughout a series of three, to prevent the pins from dislodging. The fourth pin of the series includes a body 43 secured in position by a cotter pin 44. It is apparent that after the first three pins have been disposed in proper position to retain the eyes 42 of wing shafts 36, pin 43 may be readily shifted into position with one end overlapping a head 41 of an adjacent pin and with the cotter pin 44 thereupon applied to pin 43 to maintain it against displacement.

Obviously, as shown in Fig. 4, the side face 45 and base face 46 of an element 33 need not extend substantially at right angles with respect to each other, as in Fig. 1. Rather, they may define between them an obtuse angle. In that event the flange or rail portion extending from raceway plate 30 or its equivalent will define with the surface of that plate a similar angle. Regardless of the angular disposition of the faces, however, the cross piece 16 in all events should be formed within the area traversed by the connecting elements with a series of openings 47 through which oil may pass.

While only one coupling unit embracing the connecting elements in the form of cones 34 and a raceway including the undersurface of plate 30 and the opposed surface of cross piece 16 or its equivalent has been shown, three assemblies of this character are provided. Also, shafts 18 and 22, together with the parts supported thereby, are included in a series of three similar units. Walls 15 and the cross piece 16 and extensions thereof form a cage which has orbital movement with shafts 18, 22 and 27. A differential assembly is furnished by the bevel gear 12 affixed to the driving shaft 11, the pinions 26 and the bevel gear affixed to the driven shaft 10; the interposed gears 20, 21, 23, 24 and 25 serving merely to effect the speed of rotation of shafts 27 over the condition which would exist had the teeth of pinions 26 been in direct engagement with the teeth of gear 12 secured to driven shaft 10.

In operation, it will be assumed driven shaft 10 is stationary and that driving shaft 11 is rotating at slow speed. Bevel gear 12, attached to driving shaft 11, will therefore similarly rotate to cause a rotation of shafts 27. However, this will not cause a rotation of driven shaft 10. Rather, the coupling structures embracing elements 33 will simply idle within the grooves 29 or against the surfaces of plates 30.

Therefore, with the bevel gear 12 attached to driven shaft 10 stationary, pinions 26 will cause a rotation of gears 25. Those gears meshing with the teeth of gears 24 will turn the latter around shaft 22. Accordingly, the teeth of gears 23 connected to move with gears 24 will serve to rotate gears 21 and the shaft 18. Pinion gears 20 moving in synchronism with gears 21 and having their teeth enmeshed with the teeth of the bevel gear 12 affixed to the driven shaft 10 will simply have orbital movement around that bevel gear 12. In the illustrated embodiment, the reduction drive provided by gears 25, 24, 23 and 21 affords substantially a four-to-one ratio. Accordingly, under the conditions described, the cage comprising the end pieces 15 and the cross piece 16 will have orbital movement around the axis of the assembly at a speed one-fourth the speed of rotation of driving shaft 11.

If now the speed of rotation of driving shaft 11 is increased, then the coupling assemblies will begin to become operative. This will occur as a consequence of two factors. First, the groups of elements 33 will bear with increasing intimacy against the inner faces of raceway plates 30 or their equivalents. Secondly, those elements will similarly bear against the face or flange 37 of any equivalent surface. Obviously, the intimacy of contact between faces 34 or 45 of the coupling elements and the inner faces of plates 30 will result from the fact that as the speed of driving shaft 11 is increased, the speed of rotation of the cage 15—16 will increase and centrifugal force in a direction radial to the axis of shaft 11 will come into being. Also, with the rotation of shafts 27, the wing shafts 36 will, under the action of centrifugal force, tend to assume positions perpendicular to the axes of shafts 27. Accordingly, this will enhance the intimacy of engagement of the side faces 34 of the elements 33 with the inner faces of plates 30.

With the increase in rotational speed of shafts 27, elements 33 will under the action of centrifugal force also tend to move away from the axis of each individual shaft 27. In view of the fact that they are slidably mounted upon the wing shafts 36, there will be no restraint to this movement. Accordingly, elements 33 under the action of centrifugal force will not only move out of the grooves 29, but will also bear against the flanges 37 or their equivalents. The greater the speed of rotation, the greater will be the force with which they bear against the inner faces of plates 30 and their flange surfaces.

Accordingly, a retarding action will be set up which will tend to slow down the rotational speed of shafts 27. Those shafts being connected to the first gear 25 of the reduction train, this retarding action will be transmitted with greatly increased force through to pinions 20. Accordingly, the latter will engage with increasing intimacy the teeth of bevel gear 12 affixed to driven shaft 10. As the speed of rotation of driving shaft 11 is increased, this force will compel shaft 10 to rotate. With the speed of rotation of driving shaft 11 remaining constant and the starting torque of driven shaft 10 having been overcome, it will usually follow that the speed of rotation of that driven shaft will gradually increase. Regardless of this, however, and assuming merely that the speed of driving shaft 11 is increased, the force exerted by the coupling assemblies will be magnified so that gradually those assemblies will assume conditions where they are substantially stationary with respect to plates 30 or their equivalents.

Under these circumstances, shafts 27 and pinions 26 will be substantially stationary with respect to bevel gear 12 affixed to driving shaft 11. Therefore, the reduction train provided by gears 25, 24, 23 and 21 will be inoperative or substantially so. Accordingly, bevel gear 12 affixed to driven shaft 10 will not turn with respect to pinion gears 20. It follows that this bevel gear will rotate in substantial synchronism with the bevel gear 12 affixed to driving shaft 11. Under these conditions, the cage provided by parts 15 and 16 will have orbital movement around the axis of the transmission and at a speed substantially close to the speed of rotation of driving shaft 11.

It is apparent that the parts of the transmission are both statically and dynamically balanced. By employing preferably fewer than four cone or coupling elements 33 in association with each raceway, the flow of power through the transmission is smooth, continuous, free of vibratory impulses and shocks, and of infinite input-to-output speed ratio. Any torsional resonance which tends to exist incident to the driving of an engine or otherwise will not pass through the transmission, since the cone or coupling elements will move, thus acting to interrupt or break the drive between shafts 11 and 10.

Figure 2:
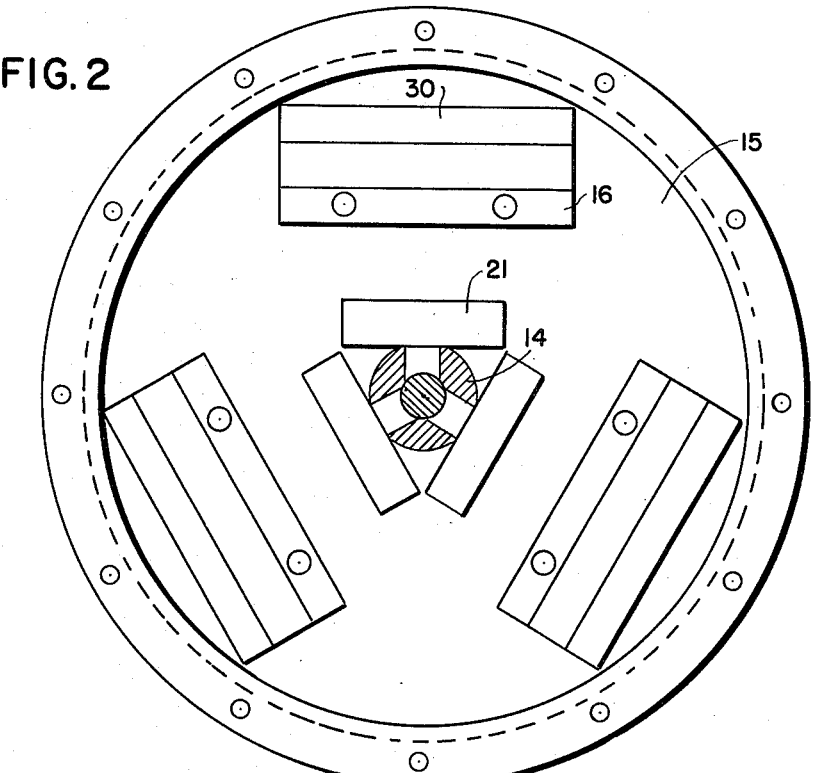
Fig. 2 is a side elevation of a transmission.

As shown especially in Figs. 2, 5 and 6, the transmission will be completely encased. It is filled to about half its capacity with lubricating oil. Since the cage rotates, the oil will seek to fly outwardly to the rim of the cage, thus forming an oil torus under the action of centrifugal force. It is apparent that the oil will fill the spaces not occupied by the elements of the coupling assembly. However, the rolling of the cones will tend to pump the oil out of the raceway space. Since the cage is rotating, the several forces involved will try to force the oil back into this space. Accordingly, a retarding action is imparted to the cones because the oil is forced to impede their motion in the raceway. This effect is enhanced by providing the openings 47, which allow a proper circulation of the oil body.

The present transmission, while capable of numerous uses, is of special value when driving a motor vehicle. One preferred manner of applying the transmission to such a vehicle has been diagrammatically illustrated in Fig. 7. In that view, the numeral 48 designates a power unit, from which shafts 49 extend and within which there may be interposed universal joints or other suitable drive-coupling units. These shafts or their equivalents are connected to the input shaft 11 of transmissions such as the present. These have been indicated at 50. With the output shafts 10 thereof coupled to or including shafts 51, the latter are suitably supported with respect to the frame 52 of the vehicle and mount conventional wheels 53. While the foregoing is one example of a propulsion drive employing the present transmission, it is apparent that numerous different arrangements of parts may be set up according to the requirements of any given installation.

In any event, it is preferred, wherever the transmission is to effect a reverse drive or a braking effect, that the casing be capable of being restrained from rotation. A structure whereby this may be accomplished has been illustrated in Figs. 5 and 6.

In those views, the numerals 10 and 11 indicate the driving and driven shafts, and 15 the side elements or members of the transmission. Disposed adjacent the latter and mounted for rotation in suitable bearings is a shaft 54, which may be actuated by a foot pedal 55. This shaft carries link arms 56 the outer ends of which are connected as at 57 to one end of a pull strap 58. The opposite end of this strap is conveniently anchored to shaft 54. The strap carries a lining 59 which is engageable with the outer face of an annular member 60 forming a part of the encasing structure of the transmission. Returning to a consideration of Fig. 7, there have been diagrammatically indicated at 61 actuating units which serve in a similar manner to apply a retarding or stopping force to the casings of the transmissions 50.

In the case of a vehicle equipped with a transmission or transmissions, it is of course intended that the vehicle shall also be equipped with a suitable braking system. However, the transmissions themselves will function as brakes. In this connection it is desirable to consider a vehicle in forward motion. Releasing the accelerator allows the engine to slow down. The driven side or components of the transmission then become the driving side. However, the reduction gearing arrangement is such that there is a step-up and exerts a high resistance to forward motion. Thus, in this aspect the transmission can serve as a brake under emergency conditions. The braking effect can be enhanced by causing the unit to drive in reverse.

Such a reverse drive will occur upon the application of a braking force to the cage. Under those circumstances the latter will be restrained or held against rotation. Therefore, no oil is forced centrifugally against the cage rim. Accordingly, the cones rotate more freely. Since the cone or coupling effect is not employed in reverse drive, there is, in addition to a minimum retarding effect by the oil, no centrifugal force acting on the cones due to cage rotation. There is, of course, a cone-to-raceway frictional reaction due to the centrifugal forces generated by the cones rolling around their raceways. This represents a power loss, but it is a relatively small one. With the gear ratio embraced in the transmission, a four-to-one reduction in drive occurs. However, this will normally be of no consequence, in that reverse speeds will always be substantially less than those demanded for forward driving.

To briefly visualize the reverse drive, it will be assumed (referring to Fig. 1) that the cage is maintained in stationary condition, by a brake arrangement such as in Figs. 5 and 6 or otherwise. With the cage having no orbital movement, it is apparent that pinions 26 will serve to effect a reverse driving of gears 25, 24, 23 and 21 in a direction opposite to that of normal drive. Accordingly, this reverse driving will be transmitted through the reduction train to bevel gear 12 affixed to driven shaft 10 and the latter will turn at slower speeds and in a direction reverse with respect to driving shaft 11.

In the case of an automotive vehicle equipped with, for example, one transmission embodying the present teachings, two pedals will suffice for the complete control of that vehicle. One of these will operate the throttle of the engine and the other the brake associated with the transmission. With two transmissions employed, as in the case of the structure shown in Fig. 7, one is assured that power will be delivered equally to both driving wheels. This will be especially desirable in the case of defective traction between tires and a supporting surface, as would occur incident to moisture, snow, mud, etc.

Thus, among others, the several objects of the invention as specifically aforenoted are achieved. Obviously numerous changes in construction and rearrangements of the parts may be resorted to without departing from the spirit of the invention as defined by the claims.

I claim:

1. A transmission including in combination rotatable driving and driven shafts, further rotatable shafts having their axes disposed at angles with respect to the axis of said driving shaft and mounted to have orbital movement around the same, gears connected to the inner ends of all of said shafts to turn therewith, a train of movement-reducing gears interposed between the gears connected to the inner ends of the further shafts and the gear connected to the driven shaft, the gears of the further shafts being connected to the gear carried by the inner end of the driving shaft, wing shafts swingingly connected to the outer ends of said further shafts, raceways encircling said further shafts and elements rotatably and slidably mounted by said wing shafts to swing outwardly with the latter away from the axis of said further shafts under the action of centrifugal force to rotatably and frictionally bear against the surfaces of said raceways.

2. In a transmission as defined in claim 1, said raceway comprising a pair of members spaced from each other and said wing shafts and the elements carried thereby being disposed within said space.

3. In a transmission as defined in claim 2, said element in each instance including side and base faces and the outermost member of said raceway including surfaces engaged with such faces as said element swings outwardly and shifts axially along its wing shaft.

4. In a transmission as defined in claim 1, at least four wing shafts and elements carried thereby being disposed to move with each of said further shafts and the connection between said wing shafts and further shafts including a pivot pin.

5. In a transmission as defined in claim 1, said raceways in each instance comprising members spaced from each other and encircling a further shaft and the innermost of said members being formed with openings for the passage of oil therethrough.

6. In a transmission as defined in claim 1, a casing enclosing the parts of said transmission and said casing receiving a body of liquid to be distributed around the interior under the action of centrifugal force as said casing rotates.

7. In a transmission as defined in claim 1, said wing shafts being equally spaced from each other around the axis of a further shaft and including a series of at least four elements on each of said wing shafts.

8. In a transmission as defined in claim 1, bevel gears furnishing the gears connected to the inner ends of said driving and driven shafts, pinion gears connected to the inner ends of such further shafts to provide in conjunction with said bevel gears a differential assembly, means providing a cage rotatably mounted with respect to said driving and driven shafts and bearings carried by said cage to encircle and support said further shafts.

9. A transmission including in combination rotatable driving and driven shafts, further rotatable shafts having their axes disposed at angles with respect to the axis of said driving shaft and mounted to have orbital movement around the same, gears connected to the inner ends of all of said shafts to turn therewith, said gears being related to transmit driving force from said driving to said driven shaft in response to the action of a connecting assembly, said assembly comprising a plurality of wing shafts swingingly connected to the outer end of each of said further shafts, raceways disposed adjacent such further shafts, elements rotatably and slidably mounted by each wing shaft to swing outwardly with the latter away from the axis of said further shaft under the action of centrifugal force to rotatably and frictionally bear against surfaces of said raceway, a casing forming a part of said transmission and enclosing the units thereof, said casing being adapted to receive a liquid which under the action of centrifugal forces will move outwardly within said casing and said transmission being formed with openings for the passage of the liquid.

10. A transmission including in combination driving and driven members, a differential mechanism interposed between and connected to said members, a coupling assembly driven by said mechanism to cause said driving member to move said driven member, a rotatably mounted cage forming a part of said differential mechanism and brake means encircling and constrictable around said cage for preventing rotational movement thereof.

11. A transmission including in combination rotatable driving and driven shafts, further rotatable shafts having their axes disposed at angles with respect to the axis of said driving shaft and mounted to have orbital movement around the same, gears connected to the inner ends of all of said shafts to turn therewith, a train of movement-reducing gears interposed between the gears connected to the inner ends of the further shafts and the gear connected to the driven shaft, the gears of the further shafts being connected to the gear carried by the inner end of the driving shaft, wing shafts swingingly connected to the outer ends of said further shafts, raceways encircling said further shafts, elements rotatably and slidably mounted by said wing shafts to swing outwardly with the latter away from the axes of said further shafts under the action of centrifugal force to rotatably and frictionally bear against the surfaces of said raceways, brake means for restraining such orbital movement and said train of gears acting in response to the functioning of the said latter means to restrain movement of said driven shaft.

12. A transmission including in combination rotatable driving and driven shafts, further rotatable shafts having their axes disposed at angles with respect to the axis of said driving shaft and mounted to have orbital movement around the same, gears connected to the inner ends of all of said shafts to turn therewith, a rotatable supporting and housing structure providing parts concentrically disposed around and spaced from said driving and driven shafts, said further shafts extending toward said structure parts, connecting assemblies each comprising a plurality of elements, an annular raceway carried by said structure parts and disposed substantially perpendicular to the axis of a further shaft at a point beyond said elements, means drivingly connecting said elements with such further shaft to have orbital movement around the same, said elements under the action of centrifugal force bearing against said raceway and said supporting and housing structure being formed internally with openings for the flow of oil under centrifugal force toward said raceway and elements.

13. In a transmission as defined in claim 12, parts of such housing and supporting structure being interposed between the driving and driven shafts and the elements cooperating with the raceway and having said openings formed therein, the orbital movement of the elements tending to displace oil from the surface of the raceway and such displacement of oil impeding the motion of said elements.

14. In a power transmission having driving and driven shafts extending into a supporting structure, parts of said structure being rotatable around and concentrically disposed with respect to said shafts and with a further shaft extending radially from and operatively connected to the first-named shaft to be rotated thereby, a connecting assembly comprising a wing shaft swingingly connected to the outer end of said further shaft to rotate around the axis of the latter, a circular raceway in line with and perpendicular to that further shaft and disposed beyond said wing shaft, said raceway being secured to said supporting structure, an element rotatably mounted by said wing shaft to swing outwardly with the latter away from the axis of the further shaft under the action of centrifugal force to follow an orbital path and rotatably bear against a surface of said raceway, said further shaft being operatively connected to said driven shaft, said element being slidably supported upon said wing shaft and presenting a cone-shaped body, the reduced-diameter end of said body extending toward the point of coupling of said wing shaft with said further shaft.

15. In a transmission as defined in claim 14, said raceway providing angularly disposed surfaces, the cone side face engaging one of said surfaces under the outward swinging action of said wing shaft and the base face of the cone engaging the other surface under such action and the axial movement of the cone along the wing shaft.

References Cited in the file of this patent
UNITED STATES PATENTS

| 1,775,741 | Thomas | Sept. 16, 1930 |
| 2,221,092 | Hale | Nov. 12, 1940 |

FOREIGN PATENTS

| 56,184 | France | June 18, 1952 |